Sept. 18, 1945.  R. B. MENTZER  2,385,014
SURFACE MARKING DEVICE
Filed June 13, 1941  3 Sheets-Sheet 2
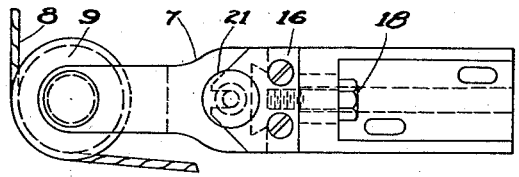
Fig III
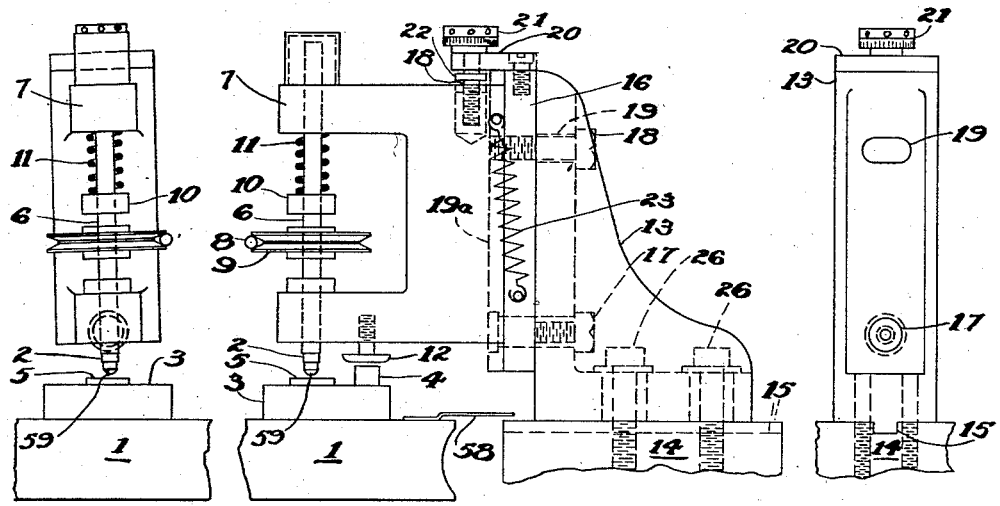
Fig. IV  Fig. V  Fig. VI
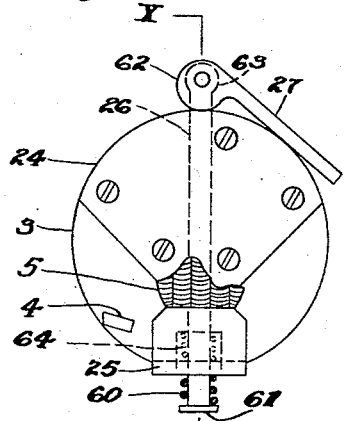
Fig. VII
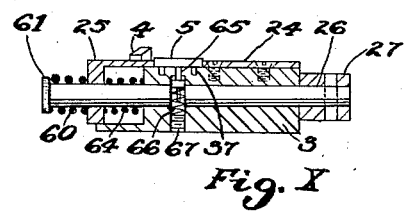
Fig. X
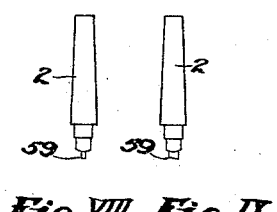
Fig. VIII  Fig. IX
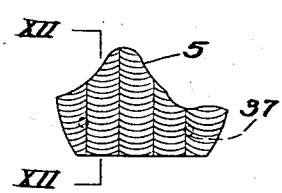
Fig. XI
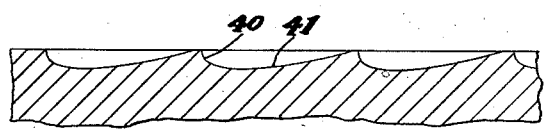
Fig. XII
INVENTOR.
RALPH B. MENTZER
BY *James M. Heilman*
ATTORNEYS.

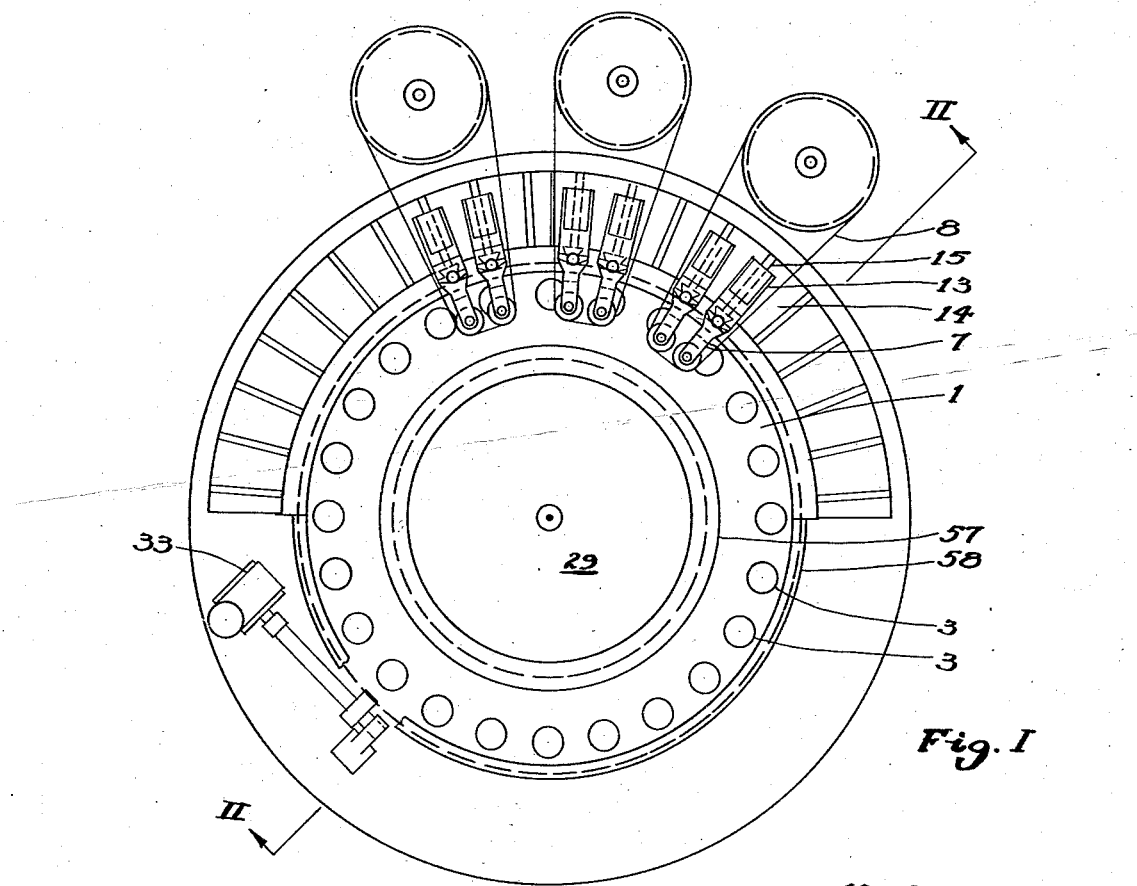
Fig. I
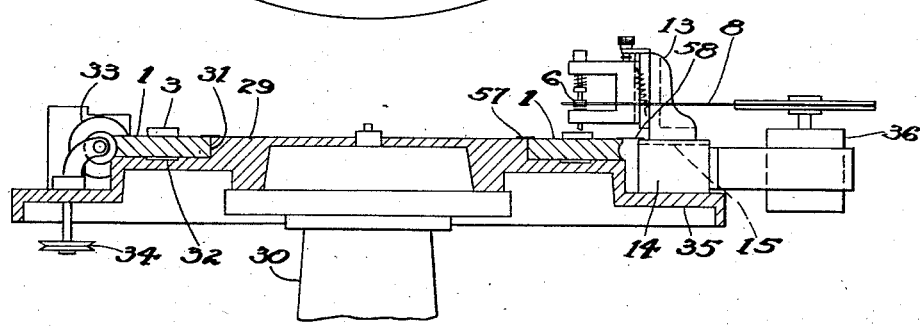
Fig. II
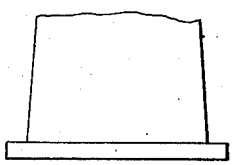
INVENTOR.
RALPH B. MENTZER.
BY James M. Heilman
ATTORNEYS.

Sept. 18, 1945.   R. B. MENTZER   2,385,014
SURFACE MARKING DEVICE
Filed June 13, 1941   3 Sheets-Sheet 3
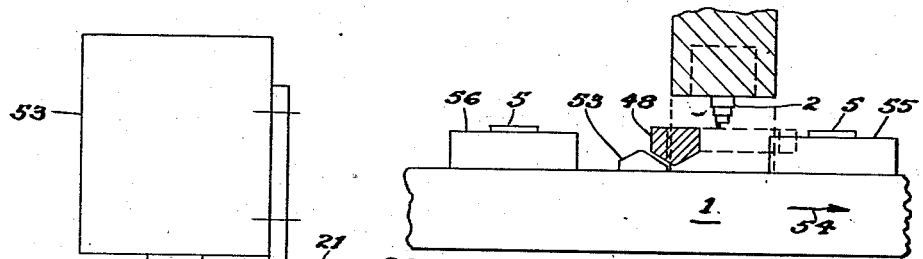
Fig. IV
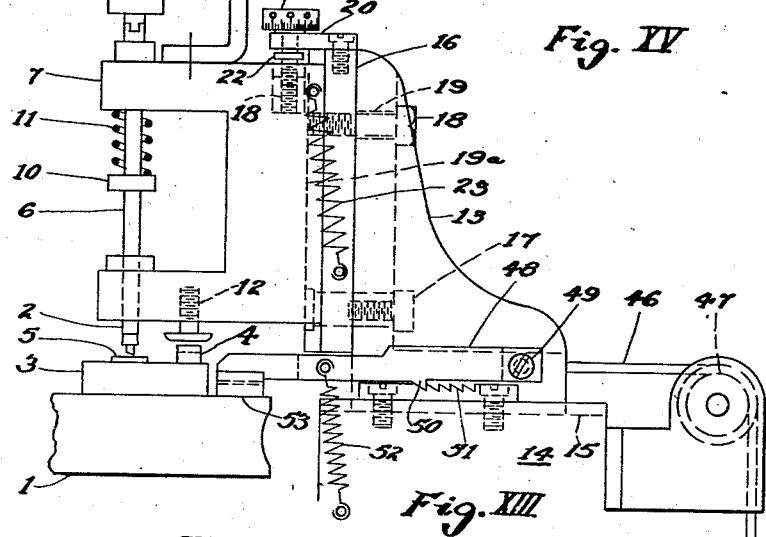
Fig. XIII
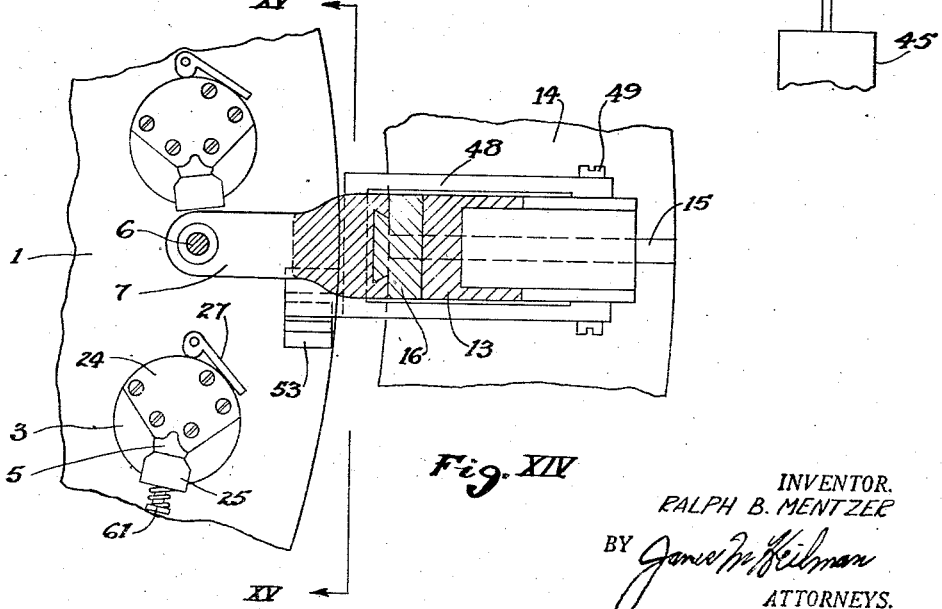
Fig. XIV
INVENTOR.
RALPH B. MENTZER
BY
ATTORNEYS.

Patented Sept. 18, 1945

2,385,014

UNITED STATES PATENT OFFICE 2,385,014

SURFACE MARKING DEVICE

Ralph Bender Mentzer, Lancaster, Pa., assignor to Hamilton Watch Company, Lancaster, Pa.

Application June 13, 1941, Serial No. 397,861

4 Claims. (Cl. 90—17)

This invention relates to the marking of surfaces and has for its object the provision of improved means and method of forming such marking.

Another object is to provide improved means and method of decorating surfaces.

Another object is to provide means and method of forming a surface decoration which is highly reflective to light by means of a milling device and action.

Another object is to provide means and method of forming a decoration similar to and having advantages and improvements over damascening decorations of the type formed by lapping.

Another object is to provide means for automatically milling various similar portions of a surface design with uniformity as to position and brightness.

Another object is to provide means for automatically milling a design on each of a plurality of surfaces adapted to be positioned in a particular relation with each other whereby when the surfaces are in that particular relation their respective designs together present a continuity of uniformity and alignment.

Another object is to provide practical means for forming uniform and aligned decorations on surfaces of small area.

Another object is to provide means for automatically preventing the milling of certain portions of a surface in a device which normally would automatically mill the entire surface.

Another object is to provide means for milling a damascene-like surface decoration, with the means so adjustable as to vary the character and/or position of the design as desired.

Another object is to provide means for milling uniform and accurate damascene-like surface designs such that the normal operation of said means may readily be carried out by an unskilled operator.

Another object is to provide means and method of milling designs comparable in quality to damascene designs at a substantially reduced cost in comparison therewith.

Another object is to provide means and method whereby a single operator may simultaneously form a desired damascene-like design on each of a plurality of separate work pieces.

Another object is to provide means for forming a damascene-like design over a given area by forming a portion of the design in the form of a path covering an area less than the given area and automatically shifting the operation of the device to a fresh portion of the given area, preparatory to forming another similar path.

Another object is to provide means for decorating certain parts of a watch by milling with a diamond tool.

Another object is to provide means for forming decorative surfaces including a tool adapted to mill a groove with a bright surface throughout when the tool is operated at a calculated speed, angle, and depth of cut.

Another object is to provide means for automatically milling a series of separate cuts in the form of a design.

Other objects and advantages of the invention will become apparent from the following description taken in connection with the accompanying drawings. It will be apparent that many changes may be made in the details of construction, arrangement of parts and steps of the method shown and described without departing from the spirit of the invention as expressed in the accompanying claims. We, therefore, do not wish to be limited to the exact details of construction, arrangement of parts and method shown, as the preferred form only has been shown by way of illustration.

Referring to the drawings:

Fig. I is a plan view of the table and rotatable work holder of the invention;

Fig. II is a section taken on line II—II of Fig. I;

Fig. III is a plan view of a tool unit of this invention;

Fig. IV is a front elevation of the tool unit;

Fig. V is a side elevation of the tool unit;

Fig. VI is a rear elevation of the tool unit;

Fig. VII is a plan view of a work chuck;

Fig. VIII is an enlarged view of the tool holder, showing an end view of the cutter;

Fig. IX is a view of the tool holder showing a side view of the cutter;

Fig. X is a section on line X—X of Fig. VII;

Fig. XI is an enlarged plan view of a finished workpiece;

Fig. XII is an enlarged partial section taken on line XII—XII of Fig. XI;

Fig. XIII is a side elevation of the device of the invention utilizing a single tool;

Fig. IV is a partial plan view of the structure of XIII; and

Fig. XV is a partial view taken on line XV—XV of Fig. XIV.

The forming of damascene designs, particularly on timepiece parts, has been an expensive, difficult and time consuming operation and one which required the services of a highly skilled operator. Also, it has been found impractical from a cost and quality standpoint to produce such designs on the parts of small watches by the usual method of lapping. Since many small watches are ladies' watches which need the utmost in beauty, decorative designs are important in the sale of such watches.

The present invention obviates the above difficulties and disadvantages by providing an automatic milling device and method which produces decorations of the damascene type and of a quality favorably comparable therewith. This device and method substantially reduces the cost of such decorations by cutting down the operation time, by making it possible for a relatively unskilled operator to readily carry out the operation, and by avoiding the necessity of preparatory surfacing and cleaning operations on the workpieces as well as making it possible to readily produce the desired designs on the parts of small watches.

The forming of a decorative design with the method and apparatus of this invention is accomplished by rotating a tool spindle with the tool, preferably a diamond, having its cutting edge located in fixed offcenter relation with the tool spindle and with the spindle tilted with respect to the surface of the workpiece so that upon rotation of the spindle, the cutting edge of the tool travels in a circle and comes in contact with the workpiece during a portion only of the circumference of the circle. The workpiece is progressively moved past the rotating tool so that the decorative mark formed on the workpiece takes the form of a series of separate lines, aligned with each other in the form of a path or flute and extending transversely thereof, with the cut in the workpiece formed by the tool not only curved in the depth of the workpiece, that is with the cut having shallow end portions and a relatively deep central portion, but also curved in the plane of the surface of the workpiece. The path or flute extends in the direction of movement of the workpiece past the tool during the forming of the path.

The tool is so formed and positioned as to produce cuts of good reflective ability throughout so that when finished no undesirable shadows appear. As is shown in Fig. XI, which illustrates the type of cut formed, the cross section is such that reflected light rays from any part of the cut are readily directed upwards out of the cut and are not trapped by any overhang of the cut in such a manner as to produce undesirable shadow effect. Instead, the entire surface of the cut is bright, and light reflections are such as to provide the desired damascene-like effect of moving highlights upon relative movement between the decorated surface and the eye.

The formation of the designs of applicant's invention may be entirely carried out through the use of one tool and associated unit as illustrated in Fig. XIII or through the use of a plurality of tools and units as illustrated in Fig. I. Automatic operation of the single unit of Fig. XIII may be accomplished by moving the work table 1, past the tool holder 2 a plurality of times in the same direction, while indexing a step in a transverse direction for each movement since ordinarily it is desirable to have the flute or path of cuts of less width than the width of the workpiece so that several flutes will appear on a single piece as is illustrated in Fig. XI. By careful control of the speed of rotation of the tool, the speed of movement of the work table past the tool, the tilting of the tool with respect to the surface of the work, the shaping of the cutting edge or edges of the tool, the depth to which the tool is allowed to cut, the radius of the circle through which the cutting portion of the tool swings, and such factors as keeping the work table quite level, the unit as illustrated in Fig. XIII is made automatic.

Automatic operation of the device of this invention using a single spindle is illustrated in Figs. XIII–XV and differs from the operation of the multiple unit of Fig. I only in that the single spindle forms all of the flutes on a single workpiece by forming one flute and then indexing sideways to the next flute position.

Provision for the indexing is made in that the angle piece 13 is slidable in a dovetail slide 15 of the support 14. The angle piece 13 and, accordingly, the tool is normally urged along the slide 15 in a direction away from the work table 1 by weight member 45 acting through a flexible connecting member 46 over a pulley 47. This movement is resisted during the forming of a single path or flute by means of a lever 48 pivoted to the angle piece 13 at 49 and having a tooth 50 engaging with a tooth of a rack 51 mounted on the base 14. The tooth 50 is normally held engaged with the rack 51 through the action of the spring 52 on the lever 48. The spring 52 has one end connected to the lever 48 and the other end to the base 14 so as to constantly pull the lever 48 downward about its pivot 49.

As the work table 1 moves past the tool in a direction effectively normal to the illustration a single path or flute is formed on the workpiece. The table 1 is provided with a cam member 53 which is so mounted and formed as to intercept the lever 48 as the table is moved past the tool, and raise it about its pivot 49 so as to momentarily disengage the tooth 50 from the rack 51. This disengagement permits the weight 45 to move the angle piece 13 a step away from the work table 1 and since the angle piece supports the tool holder 2 and the motor 53 the entire unit is moved and the tool is in position for the next path or flute to be formed on the workpiece 5 beside the first path.

If desired more than one work chuck may be positioned on the work table 1 when only one tool is used, and all of the chucks passed beneath the tool before the indexing cam is brought into action, that is, a first flute is formed on each of the workpieces and then the tool is indexed to position the tool for the second flute all around. Fig. XV illustrates such an arrangement in which the table 1 is traveling in the direction of the arrow 54, the work 5 on the chuck 55 has just had a flute formed therein and the work on the chuck 56 has previously in the same single cycle of the table 1 had a similarly positioned flute formed thereon and the lever 48 is about to engage the cam 53 so as to index the angle piece 13 and accordingly the tool in the tool holder 2 away from the table 1 so as to start the second cycle and form a second flute on the workpieces 5.

When the unit of Figs. I and II is utilized it is not necessary to move the same work piece repeatedly past the same spindle in order to complete the work but instead each spindle is so adjusted as to form a separate flute on the same work piece.

The work table 1 has a series of work chucks 3 thereon and the chuck 3 supports a cam 4, Fig. V, which is adapted to move the tool holder 2 away from the work piece 5 when it is desired to prevent the tool from cutting certain portions of the work piece as in the instance when it is desired to leave a bearing surface undecorated.

The cam 4 may be used on as many of the chucks 3 as desired since adjustment of cam screw 12 may be made to keep the cam 4 out of operation when desired. If several of the chucks have cams on them and it is desired to use only some of the cams at one time and all at another, some of the cams may be made higher than the others so that at one adjustment of cam screw 4 the higher cams only would operate and at a lower adjustment of the cam screw, all of the cams would operate.

The tool spindle 6 is mounted for rotation in a bracket 7 and is driven from a belt 8 through a pulley 9. The tool 59 is mounted in the tool holder 2 with its cutting edge in offcenter relation to the spindle 6. The shaft 6 has a sleeve 10 fixed thereon and a spring 11 acting against sleeve 10 in one direction and against the bracket 7 in the other so as to constantly urge the shaft 6 downwardly in the direction of the work and to take up vertical end thrust on the spindle without damage to the tool, without the necessity of moving the whole spindle unit upward against the action of the relatively strong spring 23 to take care of possible tool vibrations or chatter during operation.

The bracket 7 supports the cam screw 12 the head of which extends downwardly and is adapted to contact the cam 4 of the work chuck 3. The cam screw 12 is adjustably mounted in the lower portion of the bracket 7 so that it may be caused to contact different cams of different heights or it may be so adjusted as to be kept out of operation entirely in instances when it is desired to cover the entire surface of the work piece with the decorative design. The action of moving the tool away from the work upon the contact of the cam screw 12 with the cam 4 is made possible through the mounting of the bracket 7 for vertical movement with respect to plate 16 which is pivotally mounted at 17 on the angle piece 13. Plate 16 and bracket 7 and, accordingly the tool holder 2, are pivoted as a unit about the horizontal pivot 17 on the angle piece 13 to permit the tool shaft 6 to be angled with respect to the vertical so that with the tool 59 properly adjusted through screw 18 for vertical position it will contact the work piece 5 only during a portion of each of its rotations in accordance with its offcenter relation with the tool spindle 6.

The angle piece 13 supports the plate 16 and bracket 7 and is slidably mounted for horizontal movement toward and away from the chuck 3 in the grooves 15 of the support plate 14. This sliding movement permits the adjustment of the tool 2 to different positions laterally of the work piece, that is, so as to provide a flute at different portions of the work piece. When a group of tools is used, as in Fig. I, this adjustment is made through holding bolts 26. When only a single unit is used, that is, one tool, this adjustment is automatically made after each time the work is moved past the tool so as to present a new and fresh surface to the tool through the automatic indexing action of cam 53, Fig. XV.

When the tool units are used in groups as illustrated in Fig. I the angle pieces 13 are adjusted on the bases 14 along their grooves 15 to different positions so that one tool will form the first flute and the next tool will form the flute beside it and so on until the entire surface of the work piece has been decorated and without the workpiece having passed any one of the tools more than once.

The unit comprising the bracket 7 and plate 16 is held in adjusted position about the pivot 17 in the angle piece 13 by a screw 18 which is threaded into the plate 16 and which lies in the slot 19 in the angle piece 13. The slot 19 permits at least sufficient lateral movement of the screw 18 when the bracket 7 is moved about the pivot 17 to permit the tool spindle 6 to be angled sufficiently with respect to the workpiece 5 to cause the tool to cut the work during a portion only of each revolution of the tool.

The bracket 7 is mounted on the plate 16 by means of the dovetail slide 19a. The plate 16 supports a top piece 20 in which an adjustment and stop pin 18 is mounted. The pin 18 has a head member 21 which acts as a stop when moved against the top piece 20 and limits the downward movement of the tool so as to accurately and rigidly fix the maximum downward extent of the cutting action of the tool. The lower end of the pin 18 is threaded into the bracket 7 to permit vertical adjustment of the tool. The pin 18 also has a stop member 22 below the top plate 20 to prevent excessive upward movement of the bracket 7, and is so positioned on the pin 18 as to provide sufficient space below the plate 20 to permit the operation of any of the cams 4. The bracket 7 is urged downwardly by a spring 23 which has one end fixed on the plate 16 and the other on the bracket 7. The bearing of the head member 21 against the top plate 20 limits the downward movement of the bracket 7 under the action of the spring 23.

When the cam screw 12 is contacted by the cam 4 the bracket 7 is lifted and moved along the dovetail slide 19a within the limits provided between the stop 22 and the top plate 20. The vertical position of the cutting edge of the tool 2 with respect to the workpiece may be varied by adjustment of the screw 18 which moves the bracket 7 vertically relative to the work table 1.

The work chuck 3 comprises a fixed holding plate 24 and a holding plate 25 movable along a spring pressed shaft 26 and a cam lever 27 adapted to hold the jaws of the chuck open or closed depending upon the position of the cam lever 27. The chuck is opened or shut by the movement of the plate 25 along the shaft 26, away from, or toward the fixed plate 24. The shaft 26 has two coil springs mounted thereon, see Fig. X, one of which, at 60, is mounted between the head 61 of the shaft 26 and the plate 25. When the chuck is closed, as in Fig. VII, spring 60 is compressed through the tightening action of cam 62 of the lever 27, and the plate 25 is held against the workpiece 5.

When the lever 27 is moved about its pivot 63 to the low point of cam 62, spring 60 is released to a point where it has relatively no action in either direction. When the compression of spring 60 is thus released, the second spring, at 64, which bears on plate 25 and the body of the chuck 3, moves the plate 25 along the shaft 26 toward the head 61, thus opening the chuck and relieving the holding pressure on the workpiece 5.

The holding pressure of the plate 25 having been removed, the workpiece is moved upward an amount sufficient to permit it to be readily picked up, under the action of a pin 65 and spring 66. The spring 66 is backed up by a holding screw 67.

As shown in Fig. X the workpiece 5 has a plurality of locating pins 37 and the chuck member 3 has depressions therein suitably placed to receive these pins so as to bring about a desired initial position of the workpiece. The clamping action of the plate 25, pushing the workpiece against the fixed plate 24, accurately locates the workpiece, since the plates 24 and 25 have workpiece engaging edges formed to complimentary contours of the edges of the workpiece to be held therebetween.

In many cases, particularly watches, it is desirable to have decorative designs of the type described on a plurality of separate and/or interchangeable pieces which are placed adjacent each other in their proper assembled positions, for instance, the various bridges and plates of a watch, and to have the flutes or lines of the design follow along in uniform and aligned relation from one piece to the other. For this reason the preliminary locating recesses and the workpiece contours are formed in the chucks 3 and each workpiece is positioned and held on the chuck in such a manner as to give its decorations the desired positional relation with the other decorations on the other pieces when the various pieces are assembled in their normal relation with each other.

Groups of the units such as illustrated in Fig. XIII, may be utilized as shown in Fig. I without the automatic indexing arrangement of cam 53 and lever 48, to provide a continuously operating automatic machine with each unit performing a different operation on the workpiece, that is, each unit is so positioned as to form one of the several flutes on the workpiece so that when the workpiece has once moved past all of the tools its entire surface as far as is desired has been covered.

This automatic unit comprises a work support in the form of a rotatable annular plate 1 mounted on a table 29 which is in turn supported by a base or pedestal 30. The annular plate 1 is adapted to rotate on the table 29 about the arbor 31 of the table 29 and on a film of oil which is supplied from an oil reservoir 32 in the plate 29 and drawn between the lower surface of the plate 1 and the surface of the table 29 which the plate overlies.

The annular plate 1 has gear teeth on its peripheral edge and is rotated through a worm gear in connection with the teeth of the plate periphery and a reduction gearing 33 and a pulley 34 and has a group of work holder chuck members 3 spaced about its periphery.

The table 29 has an outer shoulder 35 on which is fixedly mounted a group of tool units such as that illustrated in Fig. V, with the bases 14 mounted on the shoulder 35 so that the angle piece 13 and accordingly the tool member may be moved along the dovetail slides 15 to move the tool member radially with respect to the center of rotation of the annular plate 1. As a protection from dirt or other matter, annular cover members 57 and 58 are secured in overlying relation respectively with the meeting faces of the work support 1 and the central arbor 31 and the spacing between work support 1 and the tool base 14.

Accordingly each chuck member 3 has a workpiece 5 mounted therein and the annular plate 1 carries the chucks around beneath the various tool units so that each tool forms one flute on each workpiece. The tools are so adjusted as to completely cover the workpiece, insofar as is desired, with the recorative design, by forming one flute per spindle with the flutes side by side. One rotation of the annular plate 1, or at least sufficient rotation of that plate to move the workpiece past all of the operating spindles, is sufficient to complete the desired design on the workpiece. The spindles 6 are driven by individual motors 36 which are mounted on the bases 14 of the tool holding units and one motor is made to drive two of the tool units, although one motor could be made to drive one or more than two of the units if desired.

The path or flute formed on a workpiece by one of the tools or by the tools of this invention may be made to whatever contour is desired. In the arrangement shown in Fig. I the path will be slightly curved in accordance with the radius of the work support 1. The radius may be made greater or less as desired by forming the work support 1 to greater or less diameter, or the workpieces may be made to pass beneath the tools in a straight line or any desired curve by otherwise varying the nature and motion of the work supporting plate.

The angling of the tool shaft 6 with respect to the workpiece 5 and chuck 3 is illustrated in Fig. IV. The shaft is at an angle with the workpiece 5 and the tool holder 2, see Fig. VIII, has the tool member 59 mounted thereon with its cutting edge in off center relation with the shaft 6. This illustrates the movement of the tool, that is, during a portion only of each of its revolutions it cuts into the workpiece and during the remainder of the revolution it swings in the air and has no cutting action on the workpiece so that as it is moved past the workpiece it forms a series of separate curved lines thereon.

A plan view of a typical workpiece which is a part of a watch and which has a finished design thereon is shown in Fig. XI illustrating the curved separate lines which are incomplete portions of circles and the paths or flutes formed thereby.

A very important feature of this invention is the provision of reflecting surfaces throughout the cuts formed by the tool. It is essential to have the proper reflection since it is this reflection which gives the beauty to the design. A cross section of the cut enlarged and partially taken along the line of XII—XII in Fig. XI is shown in Fig. XII, and illustrates the cross section of the cuts at their deepest points. The tool is so formed and sharpened that the cut surface in both of the portions indicated at 40 and 41 are given a brightness so that a proper reflection is produced throughout the cut.

What I claim is:

1. In a device of the character described, a supporting member, a substantially circular plate member mounted on said support for rotation about a vertical pivot and on a film of lubricant, a plurality of workholders mounted on said plate in spaced arrangement about the periphery thereof, a plurality of toolholders mounted on said support in spaced arrangement about the periphery of said plate at progressively increasing radial distances from said vertical pivot, and means for rotating said plate about said pivot, said workholders each having a work clamping arrangement comprising a fixed plate and a spring pressed horizontally slidable plate, and said toolholders each including a base mounted on said supporting member for horizontal adjustment radially of said circular plate, an intermediate member mounted on said base and adjustable with respect thereto about a horizontal pivot, a tool spindle bracket mounted on said intermediate member for straight line adjustment normally substantially vertically with respect thereto, a relatively strong spring so mounted as to tend to move said tool bracket with respect to said intermediate member, a tool spindle mounted for rotation and for longitudinal sliding movement in said tool bracket and a relatively weak spring so mounted as to tend to move said spindle longitudinally of itself in said tool bracket.

2. An apparatus for surface decoration comprising a support, a circular plate member mounted for rotation about a vertical axis carried by said support, workholders affixed to said support at spaced intervals and equidistant from the center, said workholders each supporting a single workpiece, means for scoring a plurality of series of arcs on each workpiece, each series being progressively farther from the center of said plate member by less than the extent of the arc and means associated with said workholders and said scoring means governing the cutting action of said scoring means on said workpieces.

3. An apparatus for surface decoration comprising a support, a circular plate member rotating in a horizontal plane and carried by said support, a series of chucks each supporting a workpiece carried by said member, and means for cutting an arc at progressive instants, both in time, and distance from the center of said member, said arcs forming a plurality of series of semi-circular lines and means associated with said chucks and said cutting means governing the cutting action of said cutters on said workpieces.

4. An apparatus for surface decoration comprising a support, means for moving a plurality of workpieces about a common center, a series of rotating cutters arranged at progressively increasing radial distances from said center and in the path of said workpieces, and means for rotating said cutters at a speed proportional to the speed of the moving workpieces that a plurality of series of arcs are formed on the surface of the workpiece, the overlapping of the adjacent series forming lines concentric with the path of travel of the workpieces and a cam engaging a supporting frame for said rotating cutters to control the extent of said cutting operation.

RALPH BENDER MENTZER.